US006064863A

United States Patent [19]

Matai

[11] Patent Number: 6,064,863

[45] Date of Patent: May 16, 2000

[54] CONSTITUTION OF PROTRUSIBLE EXTERNAL AND FIXED INTERNAL ANTENNA FOR RADIO PORTABLE REMOTE TERMINAL DEVICE

[75] Inventor: Masahiro Matai, Shizuoka, Japan

[73] Assignee: NEC Corporation, Tokyo, Japan

[21] Appl. No.: 08/972,076

[22] Filed: Nov. 17, 1997

[30] Foreign Application Priority Data

Nov. 18, 1996 [JP] Japan .................................... 8-306150

[51] Int. Cl.[7] ........................................................ H04B 1/38

[52] U.S. Cl. ............................ 455/90; 455/575; 343/702

[58] Field of Search ............................ 455/575, 90, 550, 455/347, 357, 562, 97, 129, 269, 272, 277.1, 278.1, 279.1; 343/702, 718, 725

[56] References Cited

U.S. PATENT DOCUMENTS

| | | | |
|---|---|---|---|
| 4,958,382 | 9/1990 | Imanishi | 455/277.1 |
| 5,138,329 | 8/1992 | Saarnimo et al. | 343/702 |
| 5,245,350 | 9/1993 | Sroka | 343/702 |
| 5,434,582 | 7/1995 | Koike et al. | 343/702 |
| 5,463,406 | 10/1995 | Vannatta et al. | 343/725 |
| 5,530,919 | 6/1996 | Tsuru et al. | 455/90 |
| 5,564,083 | 10/1996 | Lee et al. | 455/90 |
| 5,801,661 | 9/1998 | Suzuki | 343/702 |

FOREIGN PATENT DOCUMENTS

| | | |
|---|---|---|
| 61-42148 | 3/1986 | Japan . |
| 4-31805 | 3/1992 | Japan . |
| 4-85836 | 7/1992 | Japan . |
| 7-240962 | 9/1995 | Japan . |
| 7-273688 | 10/1995 | Japan . |

*Primary Examiner*—William G. Trost
*Attorney, Agent, or Firm*—Scully, Scott Murphy & Presser

[57] ABSTRACT

A radio portable remote terminal device which has two antennas, and in which an antenna not in use contributes to the performance of the antenna presently in use. An external antenna has an external antenna element which is capable of being extended from an enclosure or being retracted and contained in the enclosure reciprocally. An internal antenna has a ground section, a detector for detecting whether the external antenna element is extended from the enclosure or is retracted in the enclosure. A switching circuit switches a connection between a radio section circuit and the external antenna or the internal antenna reciprocally. A printed circuit board mounts the external antenna with the external antenna element contained in the enclosure and the internal antenna measures on opposite sides thereof. When the external antenna element is retracted into the enclosure, a radio section circuit on the printed circuit board is disconnected from the external antenna and connected to the internal antenna. When the external antenna element is extended from the enclosure, the radio section circuit on the printed circuit board is disconnected from the internal antenna and connected to the external antenna.

6 Claims, 3 Drawing Sheets

CONSTITUTION OF PROTRUSIBLE EXTERNAL AND FIXED INTERNAL ANTENNA FOR RADIO PORTABLE REMOTE TERMINAL DEVICE

BACKGROUND OF THE INVENTION

The present invention relates to an antenna for a radio portable remote terminal device. More particularly this invention relates to an extendable external and fixed internal antennas for the radio portable remote terminal device, which not only eliminates adverse interference between the external antenna and the internal antenna but also contributes to the performance of the antennas.

DESCRIPTION OF THE RELATED ART

In recent years, portability of a radio portable remote terminal device has been required. Thus an antenna used during carriage by the user is changed during use by the user. Namely, since information is not exchanged frequently during carriage of the radio portable remote terminal device, an internal antenna which is good for portability is used, even if gain is decreased slightly. While since information is exchanged frequently during use of the radio portable remote terminal device, an antenna is extended from the enclosure, and thus the antenna gain is improved. The conventional example is the Japanese Utility Model Application Laid-Open No. HEI 4-31805 which discloses that when an extendable antenna is extended from an enclosure, an internal antenna is disconnected from the extended antenna, while when the extendible antenna is retracted and contained in the enclosure, the internal antenna is connected to the extended antenna.

FIG. 1 shows such a conventional radio portable remote terminal device which comprises an internal antenna 212, a feed section 213 of the internal antenna 212, an external antenna 221 which is capable of being extended or being retracted and contained in an enclosure reciprocally, a metal fitting 222 of the feed section of the external antenna 221, and metal fittings 223 and 224 which generate a signal for detecting whether the external antenna 221 is extended from the enclosure or the external antenna 221 is retracted and contained in the enclosure. (When the metal fitting 223 is connected to the metal fitting 224 through the external antenna 221, the metal fitting 223 comes into H-state).

The conventional radio portable remote terminal device further comprises a holding cylinder 225, and a printed circuit board 201, both of which operate such that the external antenna 221 is extended or retracted smoothly.

Moreover, such a conventional radio portable remote terminal device further comprises an enclosure 231 for casing the radio portable remote terminal device, a circuit block 234 of a radio section, and a change-over switch circuit 233 for switching the connection to the external antenna or to the internal antenna reciprocally. The antenna which is connected to the circuit block 234 of the radio section is switched by the change-over switch circuit 233 in accordance with the "H"-state or the "L"-state of the input portion T. A shield 232 of the circuit of the printed circuit board functions as a ground when the external antenna 221 is extended from the enclosure to improve the gain of the external antenna 221.

In the conventional example of FIG. 1, since two antennas are constructed independently of each other, interference between the respective antennas can produce deterioration of the antenna performance characteristics. It is necessary to separate respective antennas in order to prevent interference of the respective antennas accordingly. Namely, when mounting of the antennas on the device is capable of being implemented on the radio portable remote terminal device with a large space, interference between the antennas may be disregarded. However interference between the antennas cannot be disregarded during miniaturization of the radio portable remote terminal device.

Further, as described above, it is necessary to secure the ground in order to improve the gain of external antenna, therefore, it is necessary to form the ground on the printed circuit board which presents a problem with restricted mounting of the device.

SUMMARY OF THE INVENTION

In view of the foregoing, it is an object of the present invention to provide a construction for extendable external and fixed internal antennas for a radio portable remote terminal device in which interference is eliminated between the extendable external antenna and the fixed internal antenna, and in which gain of the external antenna when in use is improved by utilizing the internal antenna which is not in use when using the radio portable remote terminal device.

According to one aspect of the present invention, for achieving the above-mentioned object, there is provided a construction of extendable external and fixed internal antennas for a radio portable remote terminal device having a first antenna means whose external antenna element is supported by an enclosure of the radio portable remote terminal device such that the external antenna element of the first antenna means is capable of being extended from the enclosure during usage of the radio portable remote terminal device, while the external antenna element of the first antenna means is capable of being retracted and contained in the enclosure when not in use, and a second antenna means consisting of a ground and an antenna element contained in the enclosure, a printed circuit board on which a radio circuit is mounted, and switching means for switching an input of the radio circuit between a connection to the first antenna means and a connection to the second antenna means reciprocally, wherein the printed circuit board is positioned between the first antenna means and the second antenna means when the external antenna element of the first antenna means is retracted and contained in the enclosure.

According to another aspect of the invention, there is provided a construction of extendable external and fixed internal antennas for a radio portable remote terminal device further having means for disconnecting the radio circuit on the printed circuit board from the first antenna means, and for connecting the radio circuit on the printed circuit board with the second antenna means when the external antenna element of the first antenna means is retracted and contained in the enclosure, wherein the first antenna means which is disconnected is arranged under a surface of the ground means of the second antenna means.

According to another aspect of the invention, there is provided a construction of extendable external and fixed internal antennas for a radio portable remote terminal device further having means for disconnecting the radio circuit on the printed circuit board from the second antenna means, and for connecting the radio circuit on the printed circuit board with the first antenna means when the external antenna element of the first antenna means is extended from the enclosure, and wherein a ground means of the second antenna means which is disconnected also functions as a ground of the first antenna.

According to another aspect of the invention, there is provided a construction of extendable external and fixed internal antennas for a radio portable remote terminal device, wherein when the external antenna element of the first antenna means is extended from the enclosure, the first antenna means is not electrically connected with the second antenna means, while when the external antenna element of the first antenna means is retracted and contained in the enclosure, the first antenna means is electrically connected with the second antenna means.

According to another aspect of the invention, there is provided a construction of extendable external and fixed internal antennas for a radio portable remote terminal device, wherein detection of whether or not the first antenna means is electrically connected with the second antenna means is implemented by metal fittings.

According to another aspect of the invention, there is provided a construction of extendable external and fixed internal antennas for a radio portable remote terminal device, wherein the first antenna means is an external antenna, and the second antenna means is an internal antenna.

As stated above, a construction of extendable external and fixed internal antennas for a radio portable remote terminal device according to the invention is provided with external antenna means whose external antenna element is capable of extending from an enclosure and which is capable of being retracted and contained into the enclosure reciprocally, internal antenna means having a ground section, a measure for detecting whether the external antenna element is projected or the external antenna element is retracted and contained, a switching circuit for switching the external antenna means for the internal antenna means reciprocally, and a printed circuit board for mounting the retracted external antenna means and the internal antenna means on opposite sides thereof.

Further, in construction of extendable the external and fixed internal antennas for the radio portable remote terminal device, when the external antenna element is retracted and contained in the enclosure, the external antenna means does not adversely effect the internal antenna means presently in use, while when the external antenna element extended from the enclosure, the internal antenna means functions as a ground means of the external antenna means to improve the gain thereof.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will now be described in detail referring to the accompanying drawings.

Figure 1:
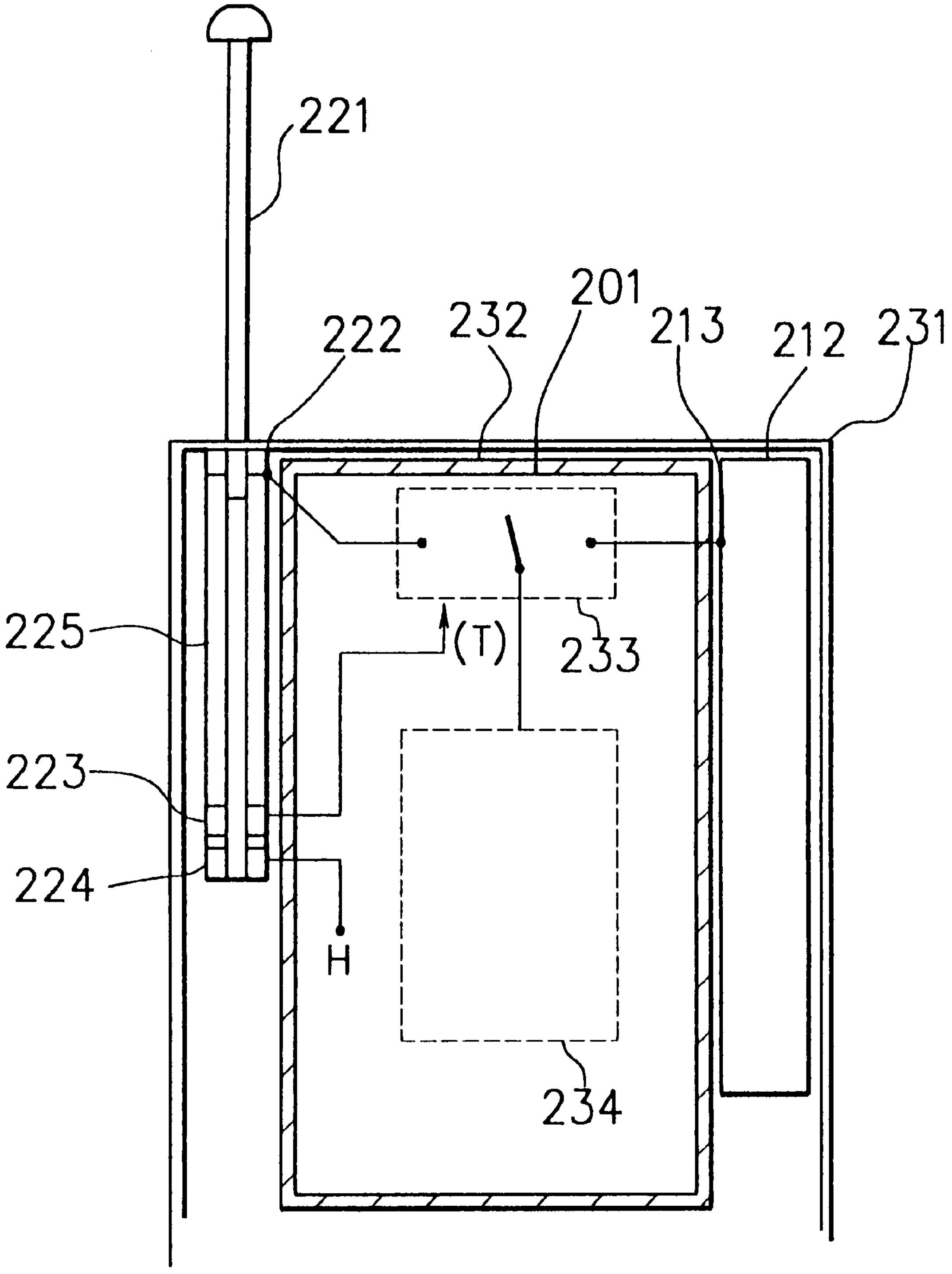
FIG. 1 PRIOR ART
FIG. 1 is a front view showing a conventional radio portable remote terminal device.
Figure 2A:
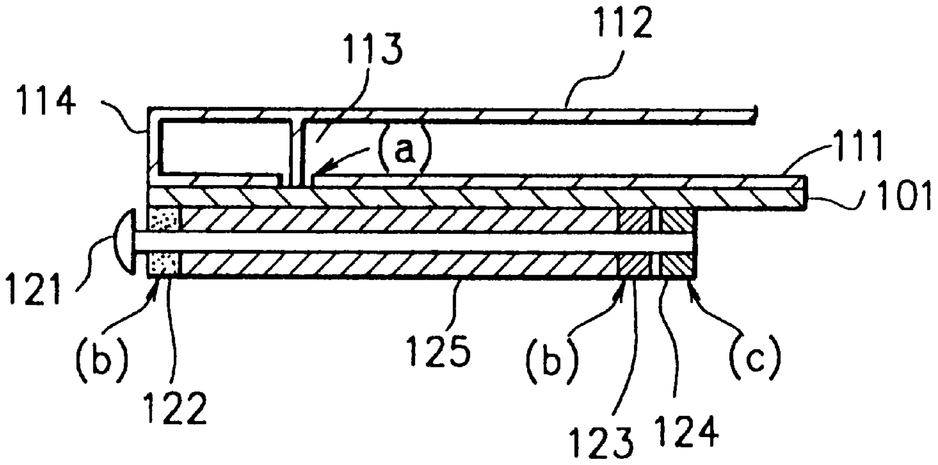
FIG. 2A is a sectional view through the terminal device of FIG. 3 showing a state wherein the external antenna element is retracted.
Figure 2B:
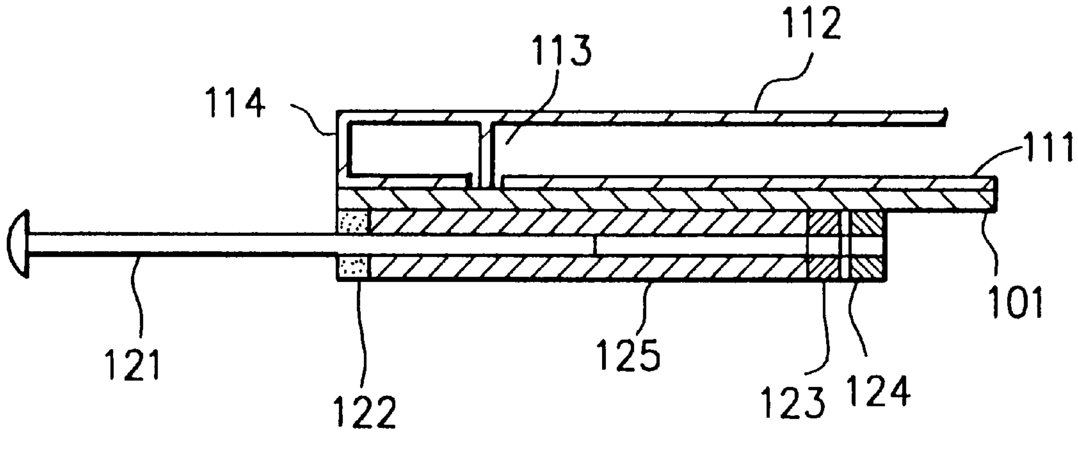
FIG. 2B is a sectional view through the terminal device of FIG. 3 showing a state wherein the external antenna element is extended.
Figure 3:
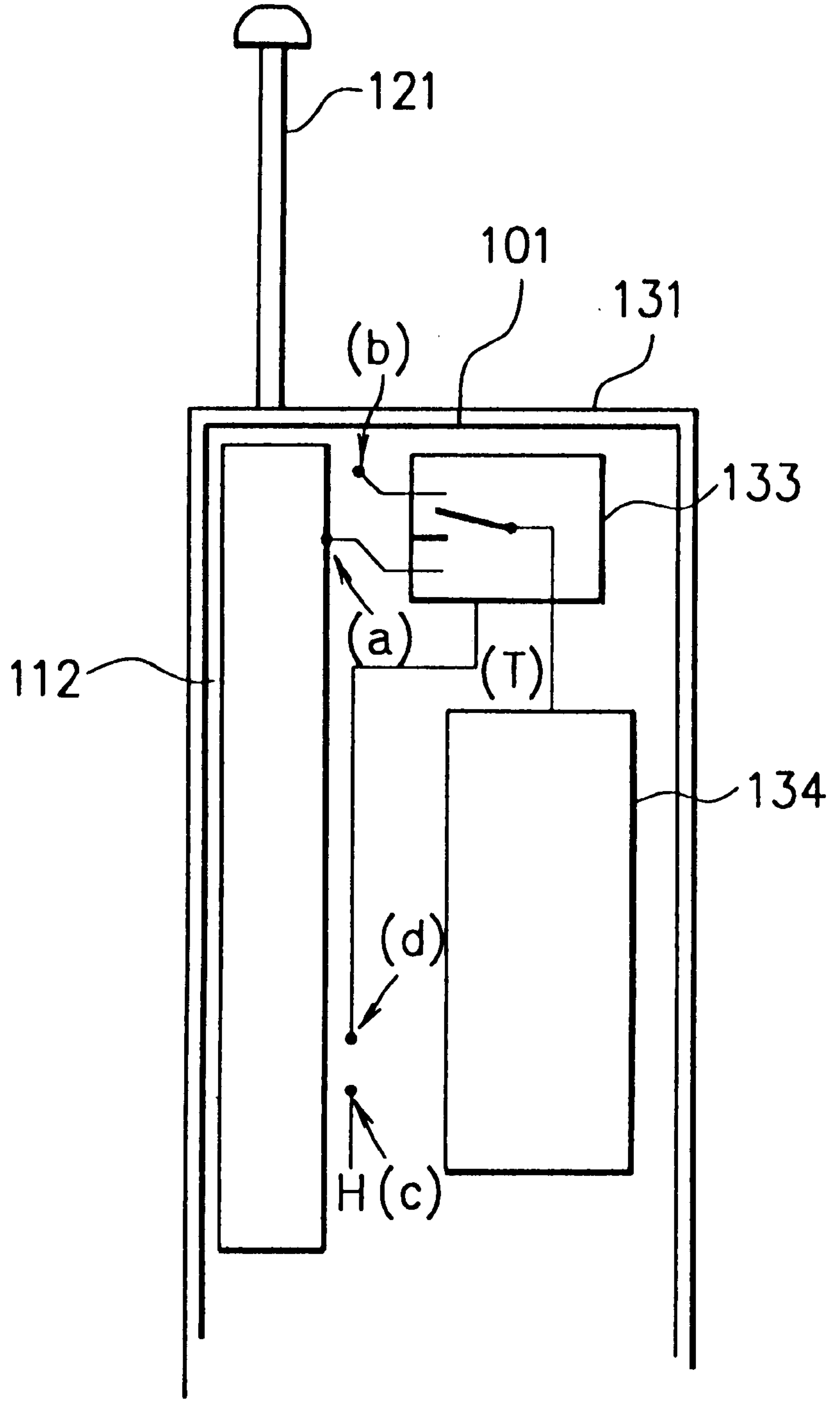
FIG. 3 is a front view showing a preferred embodiment of a radio portable remote terminal device according to the present invention.

FIG. 2A is a sectional view through the terminal device of FIG. 3 showing a state wherein the external antenna element is retracted in the enclosure. FIG. 2B is a sectional view through the terminal device of FIG. 3 showing a state wherein the external antenna element is extended from the enclosure.

An embodiment of a radio portable remote terminal device according to the present invention will be explained referring to FIGS. 2A and 2B. The radio portable remote terminal device comprises a printed circuit board 101, internal antenna means 111 to 114, and external antenna means 121 to 125. In the embodiment, the internal antenna means 111 to 114 consist of a ground 111, an antenna element 112, a feed section 113, and a short-circuit plate 114 for connecting the ground 111 with the antenna element 112. The external antenna means 121 to 125 consist of an external antenna element 121, a feed section metal fitting 122, and detection metal fittings 123 and 124 for detecting whether the external antenna element is retracted and contained in the enclosure depending upon whether the detection metal fittings 123 and 124 are electrically connected or disconnected with each other, and an external antenna cylinder 125 for containing the external antenna element 121. Furthermore, a reference mark (a) denotes an internal antenna feed section. A reference mark (b) denotes an external antenna feed section. Reference marks (c) and (d) denote detection sections for detecting whether the external antenna is extended or the external antenna is retracted and contained.

FIG. 3 is a front view showing an embodiment of the present invention. A radio portable remote terminal device comprises an enclosure 131 of the radio portable remote terminal device, a switch circuit 133 for switching between the antennas, and a radio circuit 134. Besides, in FIG. 3, a reference mark (a) denotes an internal antenna feed section. A reference mark (b) denotes a feed section of the external antenna means 121 to 125. Reference marks (c) and (d) denote detection sections for detecting whether the external antenna element is extended or the external antenna element is retracted and contained. These reference marks are the same as those of FIGS. 2A and 2B.

Next, operation of the extendable external and fixed internal antennas for the radio portable remote terminal device according to the present invention will be explained referring to FIGS. 2A, 2B and 3.

FIG. 2A is a cross-sectional view when the external antenna element 121 is retracted and contained in the enclosure. The detection metal fittings 123 and 124 detect whether the external antenna element 121 is projected from the enclosure 131 or the external antenna element 121 is retracted and contained in the enclosure 131. The metal fitting 123 is electrically connected with the metal fitting 124 through the external antenna element 121. Therefore an "H"-signal of the metal fitting 124 is inputted to an input portion T of the switch circuit 133 shown in FIG. 3 by way of the metal fitting 123. By virtue of this input, an input of the radio selection circuit 134 is connected to the feed section (a) of the internal antenna means 111 to 114, thus the internal antenna means 111 to 114 come into in use. At this time the external antenna means 121 to 125 is not in use. Since the external antenna means are arranged just under the surface of the ground means of the internal antenna means 111 to 114, the external antenna means 121 to 125 do not adversely effect the antenna element 112, with the result that it is capable of ensuring required operating characteristics.

FIG. 2B is a cross-sectional view when the external antenna element 121 extends from the enclosure. The detection metal fittings 123 and 124 which detect whether the external antenna element 121 is extended from the enclosure or the external antenna element 121 or is contained in the enclosure. The metal fitting 123 is not electrically connected with the metal fitting 124, therefore, an "L"-signal is inputted to the input portion T of the switch circuit 133 shown in FIG. 3. By virtue of this input, the input of radio section circuit 134 is connected with the feed section (b) of the external antenna means 121 to 125, thus the external antenna means 121 to 125 come into in use. At this time the internal antenna means 111 to 114 is not in use. The internal antenna means 111 to 114 function as the ground means of the external antenna means 121 to 125 so that they contribute to a gain improvement of the external antenna means 121 to 125.

As described above, the construction of extendable external and fixed internal antennas for the radio portable remote terminal device according to the present invention is capable of realizing improvement in the characteristics of the respective antennas with a small space, therefore enabling a miniaturization of the radio portable remote terminal device.

While preferred embodiments of the invention have been described using specific terms, such description is for illustrative purpose only, and it is to be understood that changes and variations may be made without departing from the spirt or scope of the following claims.

What is claimed is:

1. A construction of extendable external and fixed internal antennas for a radio portable remote terminal device comprising:

a first antenna means comprising an external antenna element supported by an enclosure of the radio portable remote terminal device to be extendable from said enclosure when said radio portable terminal device is in use, and to be retractable and contained in said enclosure when said radio portable remote terminal device is not in use;

a second antenna means which comprises a ground means and an antenna element contained in said enclosure;

a printed circuit board on which a radio section circuit is mounted; and switching means for switching an input of said radio section circuit between a connection to said first antenna means and a connection to said second antenna means, wherein said printed circuit board is positioned between said first antenna means and said second antenna means when said external antenna element of said first antenna means is retracted and contained in said enclosure, and further wherein when the second antenna means is disconnected from the input to the radio circuit, the ground means of the second antenna means serves as a ground means for the first antenna means.

2. A construction of extendable external and fixed internal antennas for a radio portable remote terminal device as claimed in claim 1, further comprising:

means for disconnecting said radio section circuit on said printed circuit board from said first antenna means before connecting said radio section circuit on said printed circuit board with said second antenna means when said external element of said first antenna means is detected to be retracted and contained in said enclosure, wherein said first antenna means which is disconnected is positioned under a surface of said ground means of said second antenna means.

3. A construction of extendable external and fixed internal antennas for a radio portable remote terminal device as claimed in claim 1, further comprising:

means for disconnecting said radio section circuit on said printed circuit board from said second antenna means before connecting said radio section circuit on said printed circuit board with said first antenna means when said external antenna element of said first antenna means is detected to be extended from said enclosure.

4. A construction of extendable external and fixed internal antennas for a radio portable remote terminal device as claimed in claim 2, wherein when said external antenna element of said first antenna means is extended from the enclosure, said first antenna means is not electrically connected with said second antenna means, and when said external antenna element of said first antenna means is retracted and contained in the enclosure, said first antenna is electrically connected with said second antenna means.

5. A construction of extendable external and fixed internal antennas for a radio portable remote terminal device as claimed in claim 2, wherein metal fittings determine whether or not said first antenna means is electrically connected with said second antenna means.

6. A construction of extendable external and fixed internal antennas for a radio portable remote terminal device as claimed in claim 1, wherein said first antenna means is an external antenna, and said second antenna means is an internal antenna.

* * * * *